US008407481B2

(12) United States Patent
Dang et al.

(10) Patent No.: US 8,407,481 B2
(45) Date of Patent: Mar. 26, 2013

(54) SECURE APPARATUS AND METHOD FOR PROTECTING INTEGRITY OF SOFTWARE SYSTEM AND SYSTEM THEREOF

(75) Inventors: Ya Bin Dang, Beijing (CN); Da Ming Hao, Beijing (CN); Shih-Gong Li, Beijing (CN); Lin Luo, Beijing (CN); Shun Xiang Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 927 days.

(21) Appl. No.: 12/163,797

(22) Filed: Jun. 27, 2008

(65) Prior Publication Data

US 2009/0327745 A1 Dec. 31, 2009

(30) Foreign Application Priority Data

Jun. 29, 2007 (CN) .......................... 2007 1 0126365
Jun. 29, 2007 (CN) .......................... 2007 1 0126465

(51) Int. Cl.

| | |
|---|---|
| ***G06F 11/30*** | (2006.01) |
| ***G06F 12/14*** | (2006.01) |
| ***G06F 7/04*** | (2006.01) |
| ***G06F 17/30*** | (2006.01) |
| ***G06F 21/00*** | (2006.01) |
| ***H04N 7/16*** | (2011.01) |

(52) U.S. Cl. ............... 713/187; 726/26; 705/57; 705/58

(58) Field of Classification Search ................. 713/187; 726/32

See application file for complete search history.

(56) References Cited

U.S. PATENT DOCUMENTS

| | | | |
|---|---|---|---|
| 5,050,212 A * | 9/1991 | Dyson | 713/187 |
| 6,067,582 A * | 5/2000 | Smith et al. | 710/5 |
| 6,430,561 B1 * | 8/2002 | Austel et al. | 1/1 |

(Continued)

*Primary Examiner* — Carolyn B Kosowski

(74) *Attorney, Agent, or Firm* — William Stock; Anne Vachon Dougherty

(57) ABSTRACT

Provided is a secure apparatus for protecting the integrity of a software system and a method thereof. The apparatus comprises: a template repository for storing templates required for generating an agent module; a template generator for randomly selecting one template from said template repository and generating a new agent module according to the selected template; and a transceiver for sending said new agent module to an external apparatus communicating with said secure apparatus to update a current agent module which is running in said external apparatus, wherein said current agent module is used to verify the integrity of said software system running in said external apparatus. The secure apparatus can protect software in an insecure environment with a high software protection level to prevent the software from being tampered or bypassed.

21 Claims, 15 Drawing Sheets

U.S. PATENT DOCUMENTS 6,643,775 B1 11/2003 Granger
6,918,038 B1 * 7/2005 Smith et al. .................... 726/22
7,051,200 B1 * 5/2006 Manferdelli et al. ......... 713/153
7,093,132 B2 * 8/2006 Aho et al. .................... 713/176
7,111,285 B2 * 9/2006 Smith et al. .................. 717/140
7,117,532 B1 * 10/2006 Lyle et al. ...................... 726/23
7,243,348 B2 * 7/2007 Good et al. .................. 717/174
7,287,166 B1 * 10/2007 Chang et al. ................. 713/187
7,331,063 B2 * 2/2008 Gunyakti et al. ............... 726/30
7,424,735 B2 * 9/2008 Sorkin et al. ...................... 726/4
7,461,402 B1 * 12/2008 Lyle et al. ...................... 726/22
7,478,233 B2 * 1/2009 Olson et al. .................. 713/150
7,613,930 B2 * 11/2009 Dotan .......................... 713/188
7,685,226 B1 * 3/2010 Norton et al. ................ 709/201
7,701,946 B1 * 4/2010 Norton et al. ............. 370/395.2
7,827,605 B2 * 11/2010 Lyle et al. ...................... 726/16
7,840,890 B2 * 11/2010 Lund ............................ 715/222
7,854,005 B2 * 12/2010 Lyle et al. ...................... 726/23
8,302,199 B2 * 10/2012 Bamberger et al. ............ 726/26
2004/0225894 A1 11/2004 Colvin
2006/0031935 A1 * 2/2006 Lyle et al. ...................... 726/22
2007/0067643 A1 * 3/2007 Zhuk et al. ................... 713/187

* cited by examiner

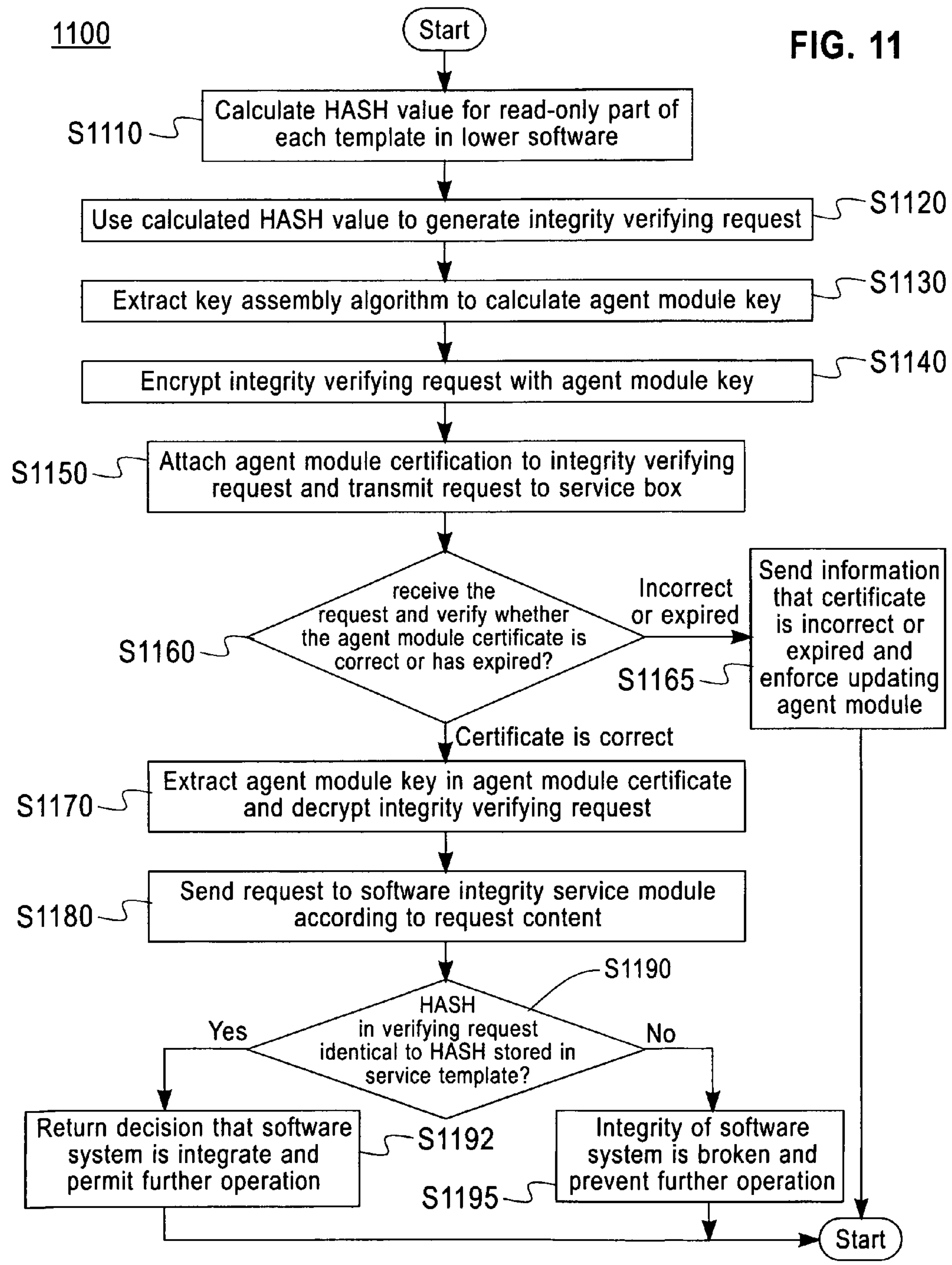
1100
FIG. 11
Start
Calculate HASH value for read-only part of each template in lower software
S1110
Use calculated HASH value to generate integrity verifying request
S1120
Extract key assembly algorithm to calculate agent module key
S1130
Encrypt integrity verifying request with agent module key
S1140
Attach agent module certification to integrity verifying request and transmit request to service box
S1150
receive the request and verify whether the agent module certificate is correct or has expired?
S1160
Incorrect or expired
Send information that certificate is incorrect or expired and enforce updating agent module
S1165
Certificate is correct
Extract agent module key in agent module certificate and decrypt integrity verifying request
S1170
Send request to software integrity service module according to request content
S1180
HASH in verifying request identical to HASH stored in service template?
S1190
Yes
No
Return decision that software system is integrate and permit further operation
S1192
Integrity of software system is broken and prevent further operation
S1195
Start

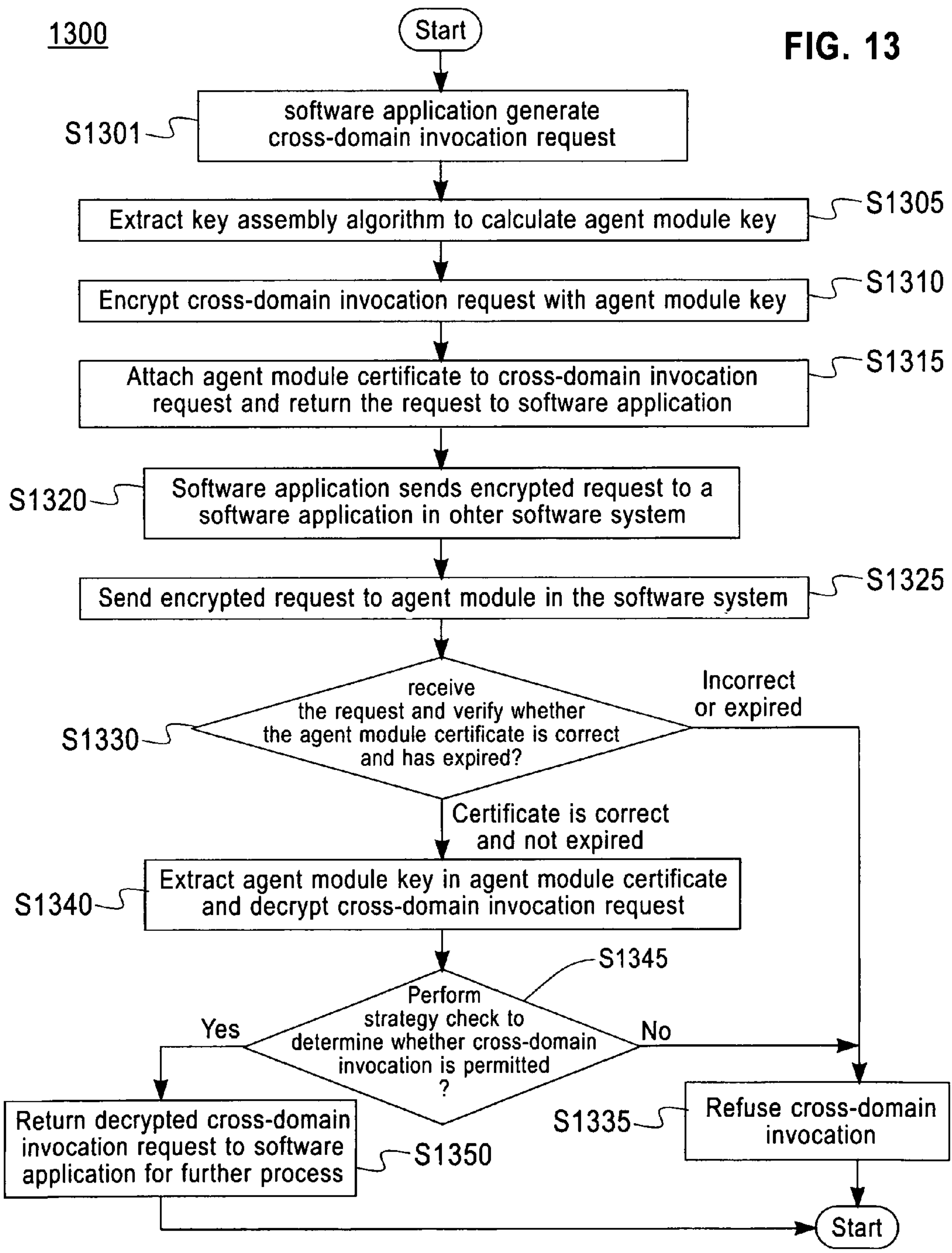
1300
FIG. 13
Start
S1301
software application generate cross-domain invocation request
Extract key assembly algorithm to calculate agent module key
S1305
Encrypt cross-domain invocation request with agent module key
S1310
Attach agent module certificate to cross-domain invocation request and return the request to software application
S1315
S1320
Software application sends encrypted request to a software application in ohter software system
Send encrypted request to agent module in the software system
S1325
S1330
receive the request and verify whether the agent module certificate is correct and has expired?
Incorrect or expired
Certificate is correct and not expired
S1340
Extract agent module key in agent module certificate and decrypt cross-domain invocation request
S1345
Perform strategy check to determine whether cross-domain invocation is permitted ?
Yes
No
Return decrypted cross-domain invocation request to software application for further process
S1350
S1335
Refuse cross-domain invocation
Start

SECURE APPARATUS AND METHOD FOR PROTECTING INTEGRITY OF SOFTWARE SYSTEM AND SYSTEM THEREOF

FIELD OF THE INVENTION

The present invention generally relates to computer and software security, and in particular, to a secure apparatus and method for protecting integrity of a software system running in an insecure environment, and a system thereof.

BACKGROUND OF THE INVENTION

In many scenarios, software delivered to a customer runs in an insecure environment for the software provider. Although some restriction mechanism is embedded inside the software package, such as "trial version" timing restrictions, customers still have strong motivation for cracking or bypassing the restriction functions to get more profits. Thus, protecting the restriction functions from being cracked or bypassed by malicious users in a hostile environment is always the concern.

With development of software services, many software providers provide service software or software modules. For software as a service offering deployed in insecure server in customer site, it's very hard to audit the transaction status of the service, though software providers always wish to do more micro-billing from their service operation.

A more general case is that those service components may be further integrated into new solutions deployed in some other customers' sites. In such cases, big concerns for the asset owner are how to be aware of the reuse status and how to control the usage to gain more profit.

In general, tamper-resistance technology (e.g., envelop) protects software programs from tampering or analyzing (e.g., extracting secret keys, proprietary algorithms, etc.). Most of the traditional tamper-resistance technologies are based on software approaches. These technologies encrypt the sensitive data/code of software to increase the bar that malicious users steal the secrets. However, the security level of pure software approaches is limited, facing the risk to be hacked by experienced crackers. Furthermore, it's hard to upgrade the security algorithm once a software program has been delivered to customer.

Another solution to avoid cracking is to migrate some key modules to the background server that is deployed at the software provider's site, that is, the secure domain. However, this solution will require the server deployed at a customer site to connect to the background server frequently, so it is not convenient for the customer (e.g., the customer may want to deploy the whole service product in a standalone laptop). Furthermore, in this case software providers have to maintain a 24/7 service to accept connections from customers.

The Trusted Platform (TP) is a computing platform with a trusted component, probably in the form of built-in hardware, which uses the component to create a foundation of trust for software processes. It uses trust based on integrity metrics of the platform to provide better security than pure software solutions. However, it's not always acceptable to deploy a TP module in customers' servers or machines. Besides, the memory size and CPU capability of certain trusted platforms may be limited to support the running service.

Dongles are used to keep software programs free from unauthorized copying, but they can't prevent the cracking or bypassing of the restriction functions.

Thus it can be seen that, in the prior art, either too low a software protection level is provided or a specific hardware is required, which are both undesirable for software providers.

What is needed is a software protection technique capable of enhancing security of the software system running in the insecure environment to prevent tampering or bypassing without changing the existing hardware architecture.

SUMMARY OF THE INVENTION

In view of the above problems, there is proposed a novel secure apparatus and method for protecting the integrity of a software system, and the system thereof.

One object of the present invention is to provide a secure apparatus, method and system thereof for protecting software running in an insecure environment with a high software protection level to prevent the software from being tampered with and/or bypassed.

Another object of the present invention is to provide a secure apparatus, method and system thereof for protecting software running at customer's site in a manner that the customer can accept.

Yet another object of the present invention is to provide a secure apparatus, method and system thereof for protecting software with a high protection level and without changing the existing hardware architecture.

To achieve the above objects, according to an aspect of the invention, there is provided a secure apparatus for protecting the integrity of a software system comprising: a template repository for storing templates required for generating an agent module; an agent module generator for randomly selecting one template from said template repository and generating a new agent module according to the selected template; and a transceiver for sending said new agent module to an external apparatus communicating with said secure apparatus to update a current agent module which is running in said external apparatus, wherein said current agent module is used to verify the integrity of said software system running in said external apparatus.

According to another aspect of the invention, there is provided a method of protecting the integrity of a software system in a secure apparatus, comprising steps of: selecting a template for generating an agent module; generating a new agent module from the selected template; and sending said new agent module to an external apparatus communicating with said secure apparatus to update a current agent module which is running in said external apparatus, wherein said current agent module is used to verify the integrity of said software system running in said external apparatus.

According to yet another aspect of the invention, there is provided a system for protecting the integrity of a software system, comprising: a template providing apparatus for storing and updating templates required for generating an agent module; a secure apparatus for receiving the template from said template providing apparatus and generating a new agent module from the received template; and an external apparatus for running said software system and a current agent module wherein said current agent module is used to verify the integrity of said software system, wherein said secure apparatus sends said new agent module to said external apparatus to update said current agent module.

In the present invention, the secure apparatus is deployed at the customer site and may be connected to the background server which is deployed at the software provider' site discontinuously. The secure apparatus is connected to the servers on which the software to be protected is deployed and it has a mechanism to enforce the whole software or the agent module embedded into the whole software to automatically update itself to a new version periodically. Therefore, in order to get the unauthorized privilege, the malicious customers would have to crack each version, thus the effort of cracking will be enhanced to an unacceptable degree for the customer. Besides, the secure apparatus may also provide some service (e.g., trusted time) to prevent malicious customers from cheating the restriction functions (e.g., through time roll-back).

As compared to traditional solutions, the present invention has the following advantages:

There is provided better security than traditional software tamper-resistance technologies without much effort. Since the update interval of the whole software or the restriction module (i.e. agent module) therein can be changed according to the dynamic risk level, the security degree can be adjusted dynamically.

It's not necessary for the secure apparatus to connect to the background server that is deployed at the software provider' site all the time, so the customer is allowed to deploy the whole service product in a standalone laptop with an attached secure apparatus and demonstrate to end users The inventive approach does not depend on a special trusted platform, so it is convenient and cost-efficient for customers. The performance will not be limited by the special hardware.

A secure apparatus can be shared by multiple servers to reduce the cost.

Thus, not only the unauthorized copying but also cracking of restriction mechanism can be prevented by the secure apparatus, secure system and method thereof proposed in the present invention.

BRIEF DESCRIPTION OF THE DRAWINGS

These and/or other aspects and advantages of the present invention will be more understood from the detailed description of embodiments of the present invention in conjunction with the following figures, in which the same or similar reference numerals are used to indicate the same or similar elements throughout the drawings, in which:

FIG. 11 shows a flow chart of a process for verifying integrity of bottom software according to an embodiment of the present invention;

FIG. 13 shows a flow chart of function invocation between software systems according to an embodiment of the present invention;

DETAILED DESCRIPTION OF THE INVENTION

Figure 1:
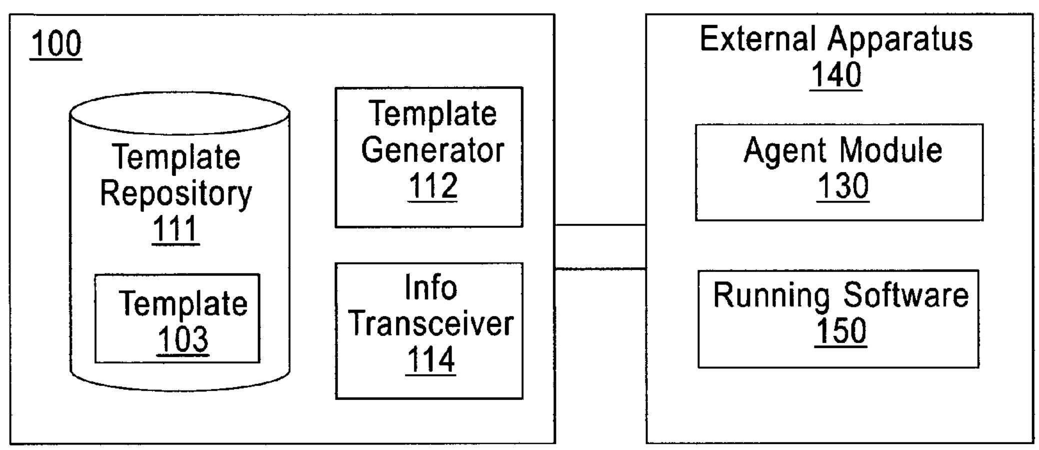
FIG. 1 shows a block diagram of a service box according to an embodiment of the present invention.

Hereinafter, description will be made in conjunction with the attached drawings. For clarity and simplicity, not all features of actual embodiments are described in the specification. Here, it should be noted that to avoid confusing the present invention due to unnecessary details, only device structures and/or process steps related closely to the solution of the present invention are shown in the drawings, while other details which are not so related to the present invention will be omitted.

FIG. 1 shows a block diagram of a secure apparatus (service box) 110 according to an embodiment of the present invention.

As shown in FIG. 1, the service box 110 of the invention for protecting integrity of a software system comprises: a template repository 111 for storing templates 103 required for generating agent modules 130, a template generator 112 for randomly selecting one template 103 from the template repository 111 and generating a new agent module according to the selected template 103, and an information transceiver 114 for sending the new agent module to an external apparatus 140 communicating with the service box 110 to update the current agent module 130 which is running in the external apparatus 140. In the present invention, the current agent module 130 is used to verify the integrity of a software system 150 running in the external apparatus 140.

Figure 2:
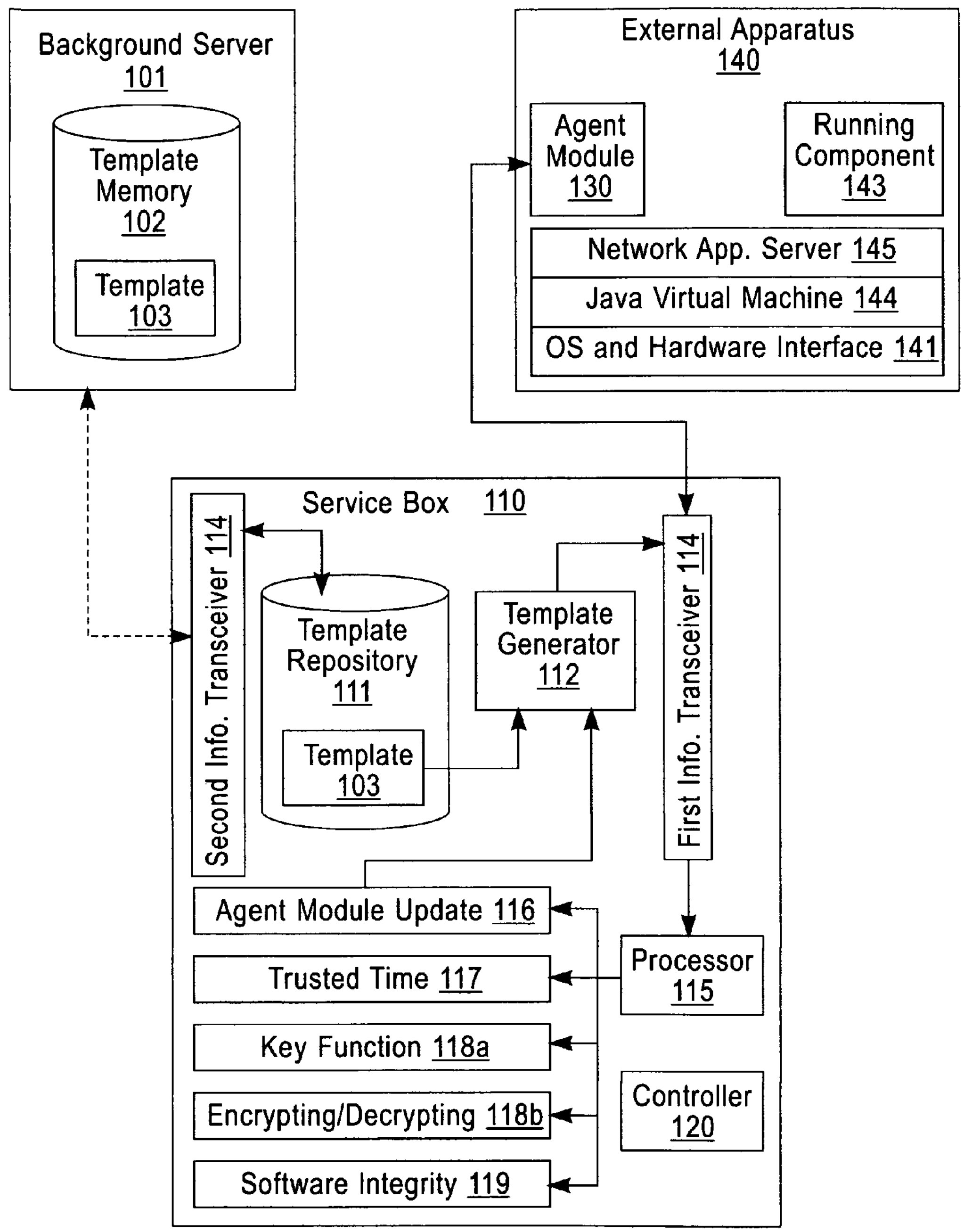
FIG. 2 shows a detailed architecture diagram of a software protection system according to an embodiment of the present invention.

FIG. 2 shows a block diagram of the architectural structure of software protection system 100 according to an embodiment of the present invention. As shown in FIG. 2, the software protection system 100 comprises a background server 101, a secure apparatus (also referred to as "service box" in the specification, which can be used alternatively) 110, and an external apparatus 140, and an agent module 130 running in the external apparatus 140. The background server 101 at a software provider's site is controlled by the software provider. The background server 101 contains a template memory 102 in which templates 103, provided by the software provider, are stored. There is a discontinuous connection between the background server 101 and the "service box" 110. When the service box 110 is connected to the background server 101, the service box 110 downloads templates 103 which are newly issued from the background server 101, and stores the templates 103 in the template repository 111. Here, the newly issued templates 103 are templates which are newly issued in a time period since the last time when the service box 110 was connected to the background server 101.

The service box 110 is located at a customer site and comprises: a template repository 111 for storing templates 103; a second information transceiver 112 for establishing a connection (bi-directional or unidirectional) with a background server 101 which may transmit various requests to the background server 101, and/or receive new templates 103 transmitted from the background server 101, and store the new templates 103 in the template repository 111; a module generator 112 for selecting a template(s) 103 from the template repository 111, and generating a new agent module from the selected template 103; a first information transceiver 114 for establishing a bi-directional connection with an external apparatus 140 external to the service box 110 so as to receive various requests from the agent module 103 in the external apparatus 140 and return various processing results to the agent module 103 in the external apparatus 140; a processor 115 for verifying requests from the agent module 130, for extracting various request messages therein, and for forwarding respective requests to corresponding service modules 116, 117, 118*a*, 118*b*, 119, etc. for processing according to contents of the respective messages.

The service box 110 further comprises various service modules, such as an agent module update service module 116, a trusted time service module 117, a key functional service 118*a*, an encrypting/decrypting service module 118*b*, and a software system integrity service module 119, for correspondingly processing various requests forwarded by the processor 115. The service box 110 also comprises a controller 120 for loading each component in service box 110 when the service box 110 is powered on, and for verifying whether these components are running normally and have not been tampered with. Although the service box 110 is a separated hardware device, since the service box 110 is deployed at the customer's site, there is a possibility that the service box 110 has been cracked by some malicious customers. Thus, the controller 120 is provided to verify its integrity when the service box 110 is powered on to run, to prevent the service box 110 from being maliciously cracked, which improves security of service box 110.

The agent module 130 is preferably a software module embedded in an external apparatus 140 which is running at the customer site. In some cases, only one module is running in the external apparatus 140, and at this time the agent module 130 itself could be the whole software system running in the external apparatus 140. At most cases, as shown in FIG. 1, the software system which is running in the external apparatus 140 at the customer site is a large-scale software system which includes multiple-layer software modules, such as operating system and hardware interface layer 141 in the lowest layer, various application running environment layers thereon (e.g. a Java virtual machine layer 144 and a network application server 145), and respective running components 143 on the top layer. In the multiple-layer software modules, the lower modules handle the lower business, such as system I/O, hardware interface, and driving, so less updating will occur; while the respective components running in the top layer of software system are related to the specific services, and thereby need to be relatively frequently modified according to service logic. According to a preferable embodiment of the present invention, in order to protect the software system while avoiding frequent updating of the existing system, it is preferred to implement the agent module 130 as one of the running components on the top layer.

A technique of a lower software layer to verify integrity of software of an upper layer running thereon has been disclosed in the prior art. In the embodiments of the present invention, the agent module 130 may verify the integrity of its lower software layer (the process of which will be described in detail later). At this time, the question firstly addressed by the invention is how to maintain integrity of the agent module 130 and prevent the agent module 130 from being cracked.

The present invention proposes a mechanism to enforce the agent module 130 to update itself to a new version automatically at certain intervals through the service box 110 so as to guarantee integrity of the agent module 130. In the mechanism, each new agent module 130 is generated randomly, so that it is very difficult for the cracker to find a general way to crack each new-generated agent module 130. Besides, some templates 103 may be selected with a very low possibility and will be rarely selected. Therefore, waiting for the presence of all the templates becomes an impossible thing. Further, since the service box 110 downloads updated templates from the background server 101 at the software provider's site periodically, it becomes nearly impossible to crack the agent module 130. Hereinafter, a more detailed description will be made to the update process of the agent module 130.

Figure 3:
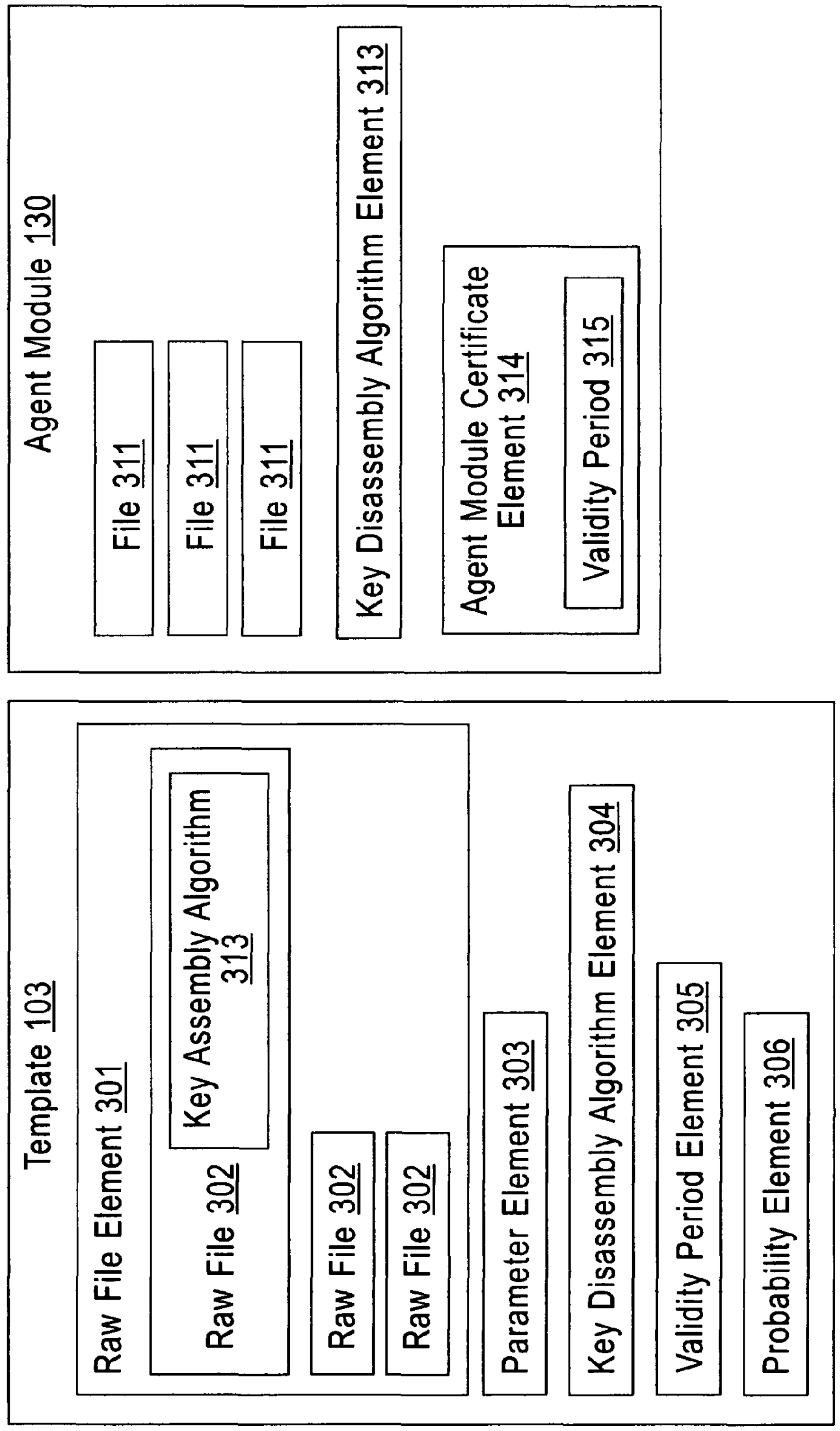
FIG. 3 shows a specific structure diagram of an agent module and corresponding template according to an embodiment of the present invention.

Before describing the update process of the agent module 130, a detailed description is made to the specific structure of the agent module 130 and template 103 corresponding thereto. FIG. 3 shows the specific structure of the agent module 130 and template 103 corresponding thereto.

As shown in FIG. 3, the template 103 contains mainly five elements: a raw file element 301 containing one or more raw files 302, each of which contains raw data of each corresponding file 311 in the agent module 130; a parameter element 303 defining which segments in each raw file 302 will be replaced by newly-generated parameters; a key disassembly algorithm element 304 which defines algorithms of how these parameters will be generated from a key, i.e. the algorithm of disassembling the key into respective parameters and embedding them into respective files 311, in which the key is a key (a first key) generated by the service box 110 for agent module 130 when the agent module 130 is generated from the template 103; a validity period element 305 defining the validity period of the template; and a possibility element 306 defining the possibility that the template is selected. In the process of generating the key for each template 103, the service box 110 may generate a symmetric key, or an asymmetric key pair which includes a private key and a public key. In the case that the service box 110 generates an asymmetric key pair, the key disassembled by the algorithm for key disassembly is the private key.

Corresponding to the specific structure of the template 103, the agent module 130 contains mainly the following elements: respective files 311 in which respective key fragments (not shown) of the key (the first key) generated for the agent module 130 are embedded; a key assembly algorithm element 313 which assembles the key fragments embedded in each file 311 using a key assembling algorithm contrary to the key disassembly algorithm to recover the key of the agent module 130; a agent module certificate element 314 signed by the service box 110 which generates the agent module 130, and includes the key of the agent module 130, the certificate further containing a validity period of the agent module 130. When the validity period expires, the agent module 130 is enforced to be updated. As described above, in the case that the service box 110 generates an asymmetric key pair for the agent module 130, the key formed by the key assembly algorithm 313 assembling the key fragments inserted into each file 311 is the private key, and the key contained in the agent module certificate element 314 is the public key corresponding to the private key.

Figure 4:
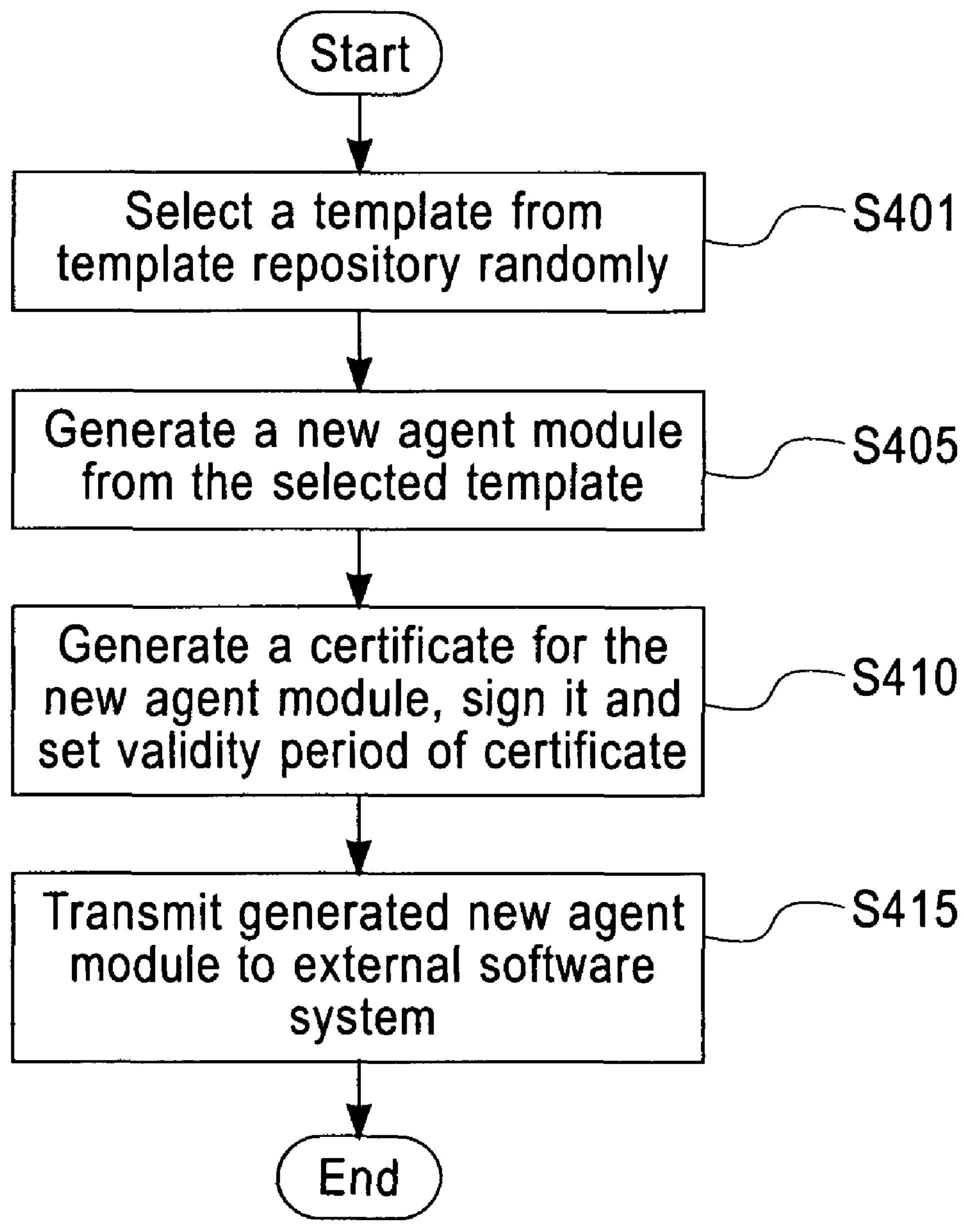
FIG. 4 shows a flow chart of a process for generating the agent module according to an embodiment of the present invention.

Next, the update process of the agent module 130 will be described with reference to FIGS. 4, 5 and 6, in which FIG. 4 shows a flow chart 400 of generating agent module 130 by the service box 110 according to an embodiment of the present invention.

As shown in FIG. 4, the process 400 for generating a new agent module begins at step S401, where the module generator 112 selects a template 103 from the template repository 111 randomly, in response to a command from the agent module update service module 116. The process of how to select the template 130 randomly will be described in detail later. The agent module update service module 116 may issue the command in response to a request from the agent module 130, or may actively issue the command by itself periodically. Of course, both cases fall into the protection scope of the present invention.

Then, the process proceeds to a step S405 where the module generator 112 generates a new agent module according to the selected template 103 (the procedure of generating the new agent module will be described in detail below).

After the module generator 112 generates the new agent module, at step S410, the module generator 112 generates a certificate 314 for the new agent module, which contains a key generated for the agent module previously (the first key, and the certificate contains the public key of an asymmetric key pair in case that the key is the asymmetric key pair), and signs the certificate 314 with the private key of the service box 110, i.e. using the key of the service box 110 itself (the second key, which is the private key in the case that the key is the asymmetric key pair) to encrypt the key or the public key of the key pair in the certificate. A validity period of the new agent module may be defined in the certificate so that the agent module 130 is enforced to be updated when the agent module 130 expires. Besides, the validity period of the agent module 130 is a value which may be dynamically adjusted. The software provider may adjust the value according to a risk level of the environment in which the software system resides in an external apparatus 140. For example, in a relative friendly environment, the validity period of the agent module 130 may be set to be longer. Then, this process attaches the certificate to the new agent module.

Next, at step S415, the first transceiver 114 in the service box 110 transmits the newly-generated agent module to the external apparatus 140 to replace an original agent module 130 (which may be referred to as a current agent module), and the process is completed.

Figure 5:
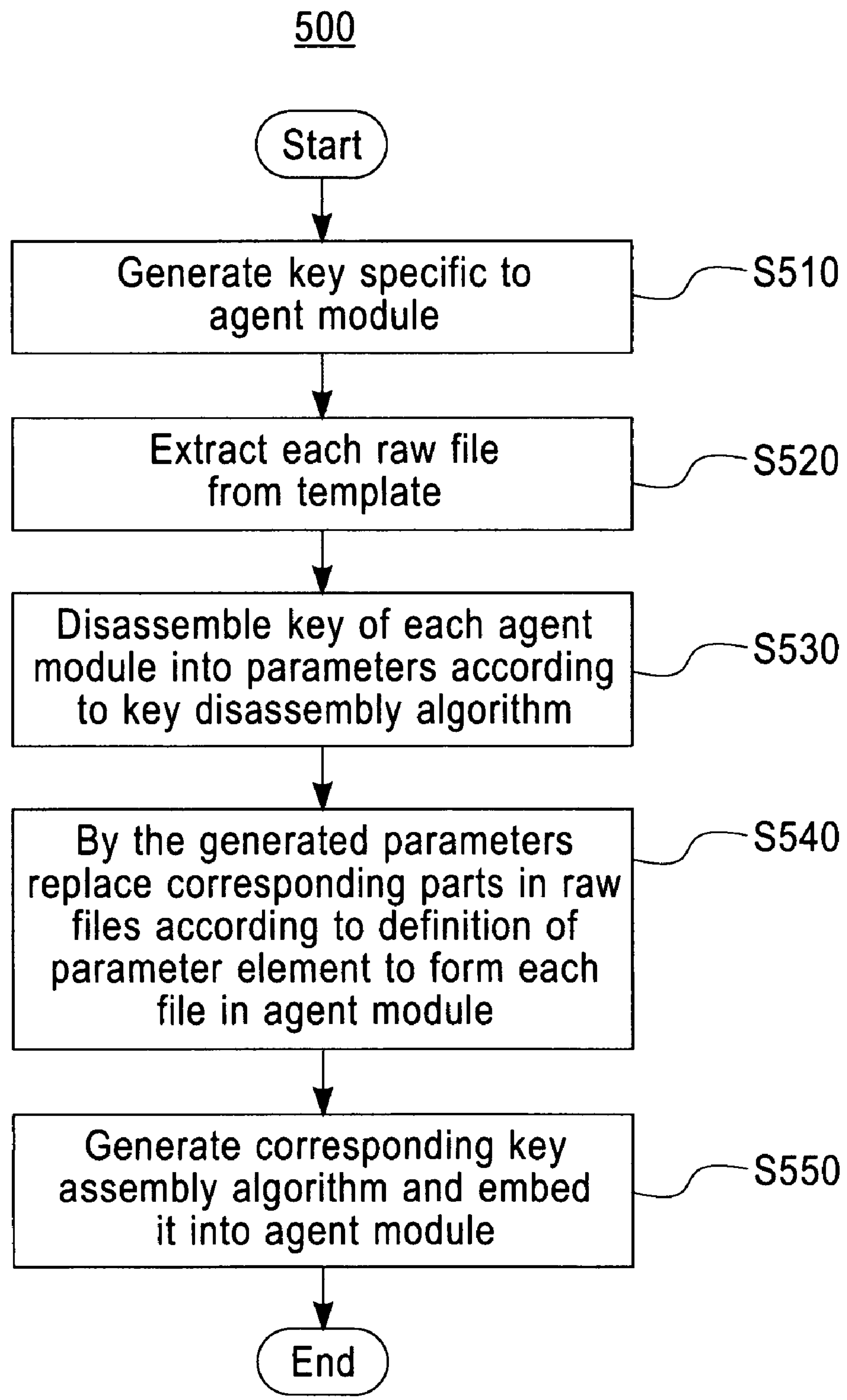
FIG. 5 shows a flow chart of a specific process for generating the agent module from the template according to an embodiment of the present invention.

FIG. 5 shows a specific process flow 500 of generating the new agent module by the module generator 112, which is a more detailed description for the above step S405. In the process, the module generator 112 firstly generates a symmetric key specific to the new agent module, or generates an asymmetric key pair in case of using asymmetric key pair (S510). Subsequently, the module generator 112 extracts each raw file 302 in the raw file element 301 of the template 103 (S520). Next, the module generator 112 disassembles the generated key (the private key in case of asymmetric key pair) into parameters according to the key disassembly algorithm in the template 103 (S530). It should be noted that not all the parameters must be a part of the key, and these parameters may be any data as long as the key assembly algorithm corresponding to the key disassembly algorithm can assemble the disassembled key according to these parameters. For example, some parameters may be date generated randomly when the key is disassembled. Then, the module generator 112 forms respective files 311 in the new agent module by using the generated parameters to replace respective parts in the raw files 302 according to the definition of the parameter element 303 of the template 103 (S540). Optionally, the module generator 112 may further generate the key assembly algorithm 313 corresponding to the key disassembly algorithm 304 and embed it into the agent module 130 (S550). Preferably, the key assembly algorithm 313 may be embedded into a certain raw file 302 as an executable code in advance. At this time, since the algorithm has been included in the new agent module, the step S550 may be omitted.

It can be known from the above FIG. 4 and FIG. 5 that the certificate and the disassembled first key are embedded into the generated agent module. The certificate is obtained by encrypting the first key with the second key.

Figure 6:
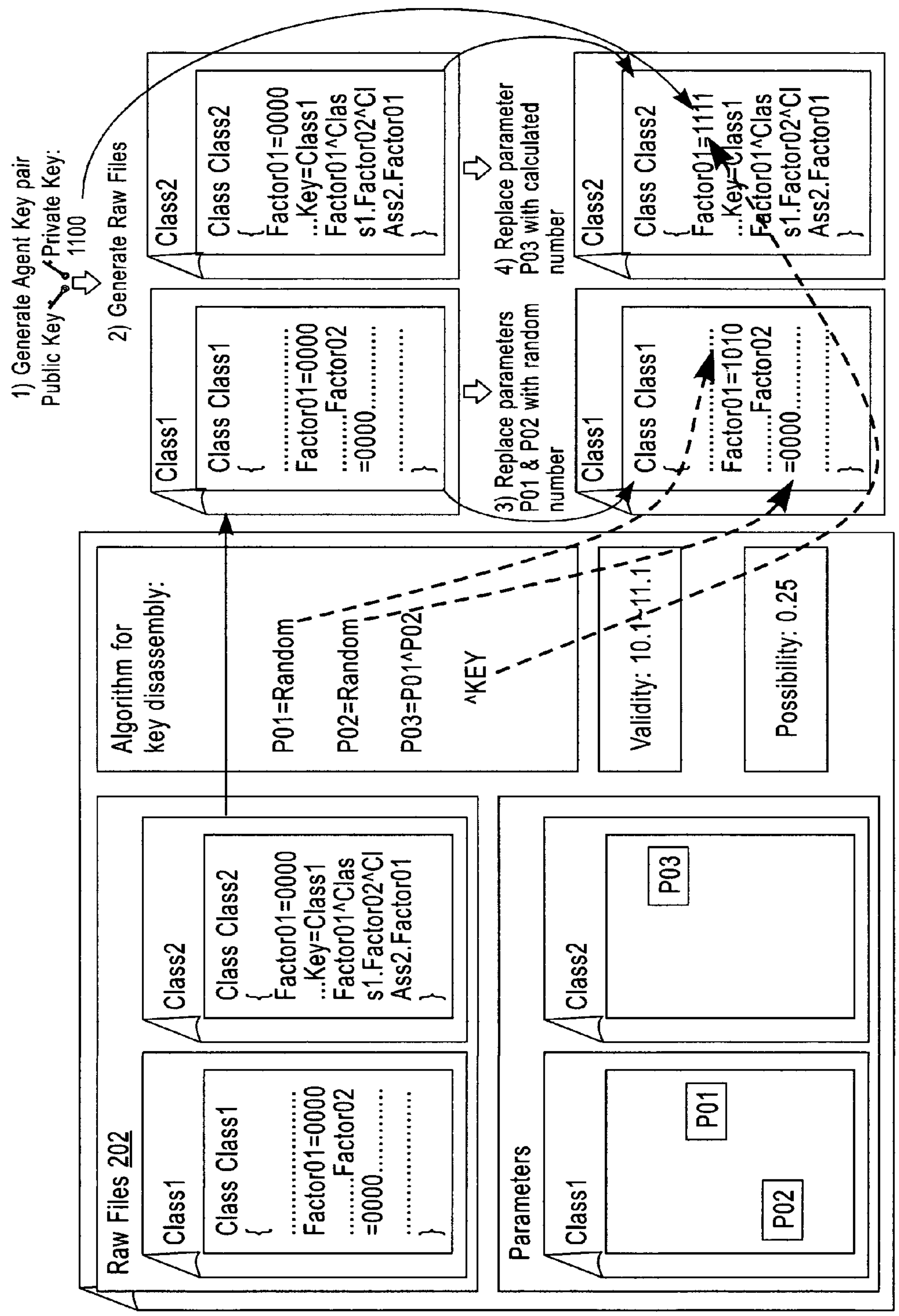
FIG. 6 shows a specific message flow of generating the agent module from the template according to an embodiment of the present invention.

FIG. 6 shows a specific example of generating an agent module 130 from template 103 according to an embodiment of the present invention. As shown in FIG. 6, the template 103 contains two raw files, i.e. Class 1 and Class 2. The parameter element 303 defines three parameter locations: a part "0000" in "Factor01=0000" (P01) and a part "0000" in "Factor02=0000" (P02) of Class 1, and a part "0000" in "Factor01=0000" (P03) of Class 2. The key disassembly algorithm 304 defines an algorithm for generating the three parameters, where P01 and P02 are random numbers, and P03 is generated according to the algorithm "P01^P02^ the private key of the agent module". The raw file Class 2 also incorporates a key assembly algorithm 313 corresponding to the key disassembly algorithm 304. During generation of the new agent module, the service box 110 generates a key pair for the new agent module, and extracts the raw files Class 1 and Class 2. Then, the service box 110 generates two random numbers 1010 and 1001 for the parameters P01 and P02 according to the key disassembly algorithm 304, and generates P03 which is 1111 according to the algorithm "P01^P02^ the private key of the agent module". Next, based on the locations of the parameters P01, P02, and P03 in the raw files Class 1 and Class 2, "Factor01=0000" and "Factor02=0000" in Class 1 are modified as "Factor01=1010" and "Factor02=1001", respectively, and "Factor01=0000" in Class 2 is modified as "Factor01=1111", whereby the files Class 1 and Class 2 are generated in the new agent module.

It can be seen from the above description that the parameter location and number in the agent module may be different with each agent module, that each agent module has its own specific key, and that the algorithm for assembling the agent module key varies with different agent modules. Thus, it is very difficult for malicious customers to crack the agent modules one by one.

The complete process flow for generating the agent module 130 by the service box 110 has been described above.

As described above, the process may be performed under the control of the controller 120 in the service box 110 responsive to an update request from the agent module 130. Now a process flow of sending the update request by an agent module 130 in an external apparatus 140 will be described in detail.

Figure 7:
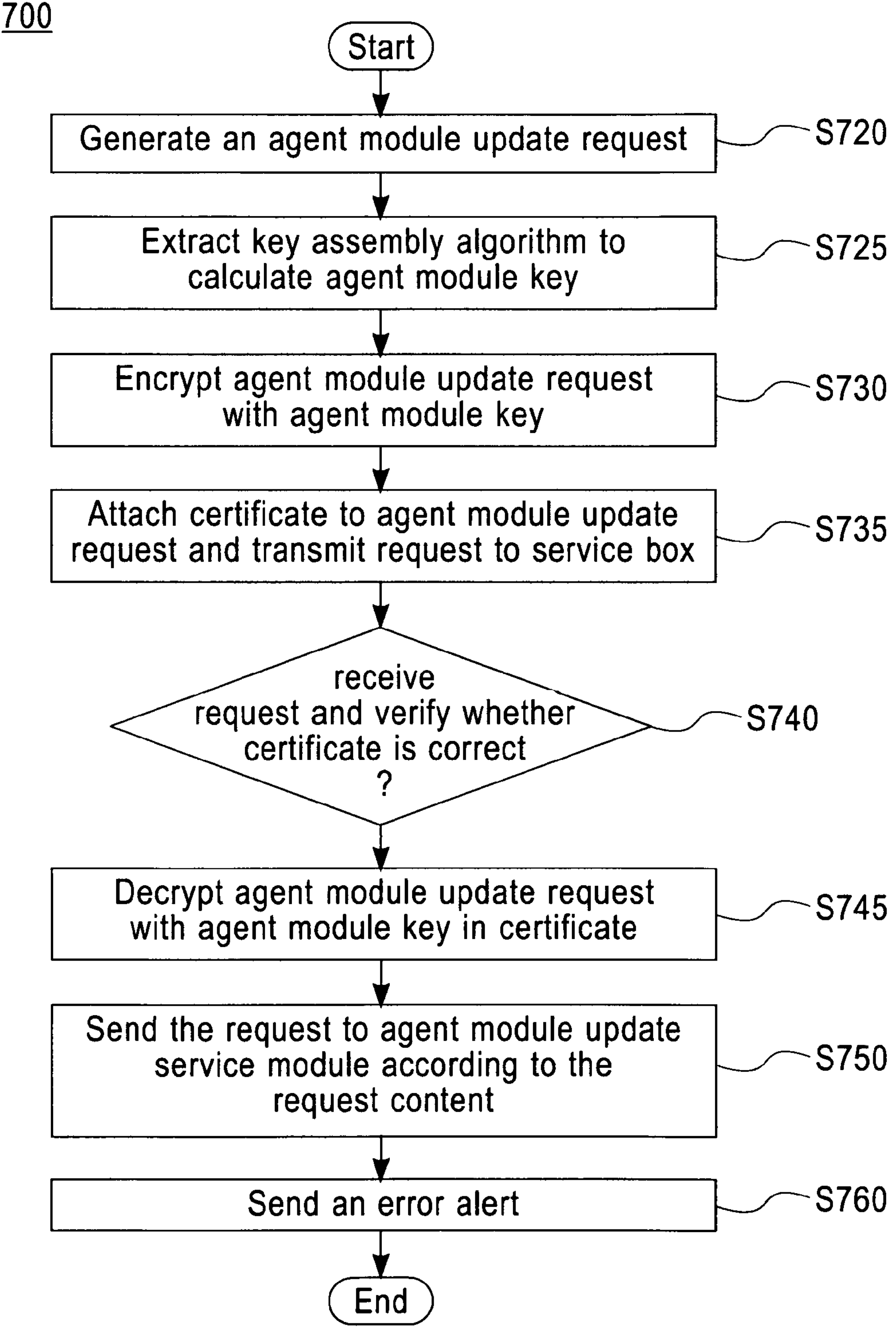
FIG. 7 shows a flow chart of generating a module updating request according to an embodiment of the present invention.

FIG. 7 shows a process flow 700 of sending and receiving the agent module update request between the external apparatus 140 and the service box 110.

As shown in FIG. 7, at step S720, the agent module 130 firstly generates an agent module update request. The process of generating the agent module update request may be performed at a predetermined time interval, the length of which may be set to different values in accordance with a specific application environment. Then, the process proceeds to step S725 where the agent module 130 extracts parameters embedded in each file 311 of the agent module 130 by the key assembly algorithm 313 embedded therein, and calculates a key of the agent module 130 (which is the private key of the agent module in the case of the asymmetric key pair). Then, at step S730, the agent module update request is encrypted with the agent module key to generate an encrypted agent module update request. Subsequently, at step S735, a certificate in the agent module 130 is attached to the request, and they are together sent to the service box 110 in the predetermined time interval described above. That is, the request (the agent module update request) generated by the agent module 130 and received by the service box 110 from the external apparatus is encrypted with the first key extracted from the agent module 130 and attached with the certificate.

At step S740, the processor 115 in the service box 110 receives the request through the first information transceiver 114 and verifies the attached certificate. Since the certificate is signed (encrypted) with the private key of the service box 110, the service box 110 can decrypt it with its public key (the second key) to obtain the agent module key (the first key) therein, to thereby verify whether or not the certificate is signed by the service box 110 (that is, to compare whether or not the agent module key is a key originally generated by the service box 110 for the agent module 130). If the verification is passed, the process proceeds to step S745. Otherwise, an error alert is sent via the first information transceiver 114 (step S755) and the process is terminated.

At step S745, the processor 115 decrypts the encrypted agent module update request with the agent module key contained in the certificate (the first key, which is the public key in the case of the asymmetric key pair) to obtain an unencrypted agent module update request. That is, the processor 115 decrypts the certificate with the second key to obtain the first key, and decrypts the encrypted request with the obtained first key to get the contents and/or type of the request.

Next, at step S750, the processor 115 sends the request to the agent module update service module 116 for processing, according to the type of the request (here, an agent module update request). The agent module update service module 116 receives the request and sends commands to the module generator 112 to start the update process of generating an agent module as described above.

As described above, the module update request is periodically sent to the service box 110, for which module generator 112 generates a new agent module in response to the module update request.

Further, at step S750, if the received request is another type of request, the processor 115 will send the request to respective service modules 116, 117, 118*a*, 118*b*, 119, etc. for processing, according to the different types of request.

It can be seen from the above description that in the process of the agent module 130 sending the update request to the service box 110, the update request is encrypted with the agent module key, and is sent to the service box 110 together with the agent module certificate. Then the service box 110 verifies the agent module certificate, decrypts the service request with the agent module key pair in the agent module certificate, and then performs related processing. Actually, not only the agent module update request, but also all the requests sent from the external apparatus 140 to the service box 110 need to be subjected to similar processes, i.e. the procedure of being encrypted with the agent module key and being decrypted at the service box 110. Such processing can guarantee the encrypted communication between the external apparatus 140 and the service box 110 and can prevent sensitive information from being leaked, thereby increasing the difficulty for cracking the communication. Besides, since the agent module will be updated periodically, it will be more difficult for the malicious users to obtain contents of the communication.

According to the above description, a template may be randomly selected in the process of generating the agent module 130 from the template 103, so as to make it more difficult to crack the agent module 130.

Figure 8:
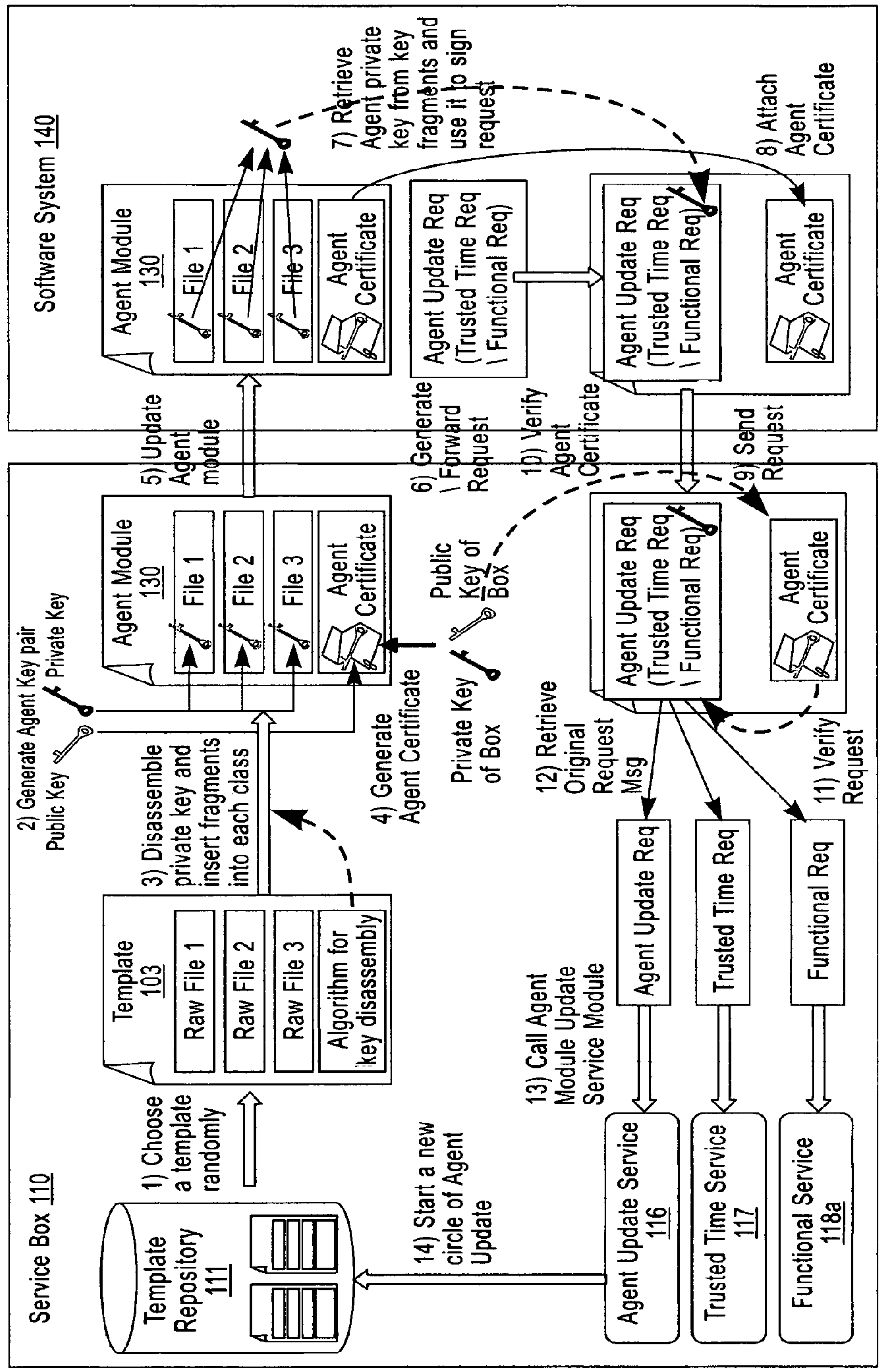
FIG. 8 shows a schematic diagram of a message flow for updating the agent module between the service box and the agent module according to an embodiment of the present invention.

The above description may be intuitively exemplified with reference to FIG. 8 which shows a schematic diagram of a message flow between the service box 110 and the external apparatus 140 when updating the agent module 130 according to an embodiment of the present invention.

Hereinafter, a storage way of the template 103 and a process flow of randomly selecting the template 103 will be described in more detail with reference to FIG. 9 and FIG. 10.

Figure 9:
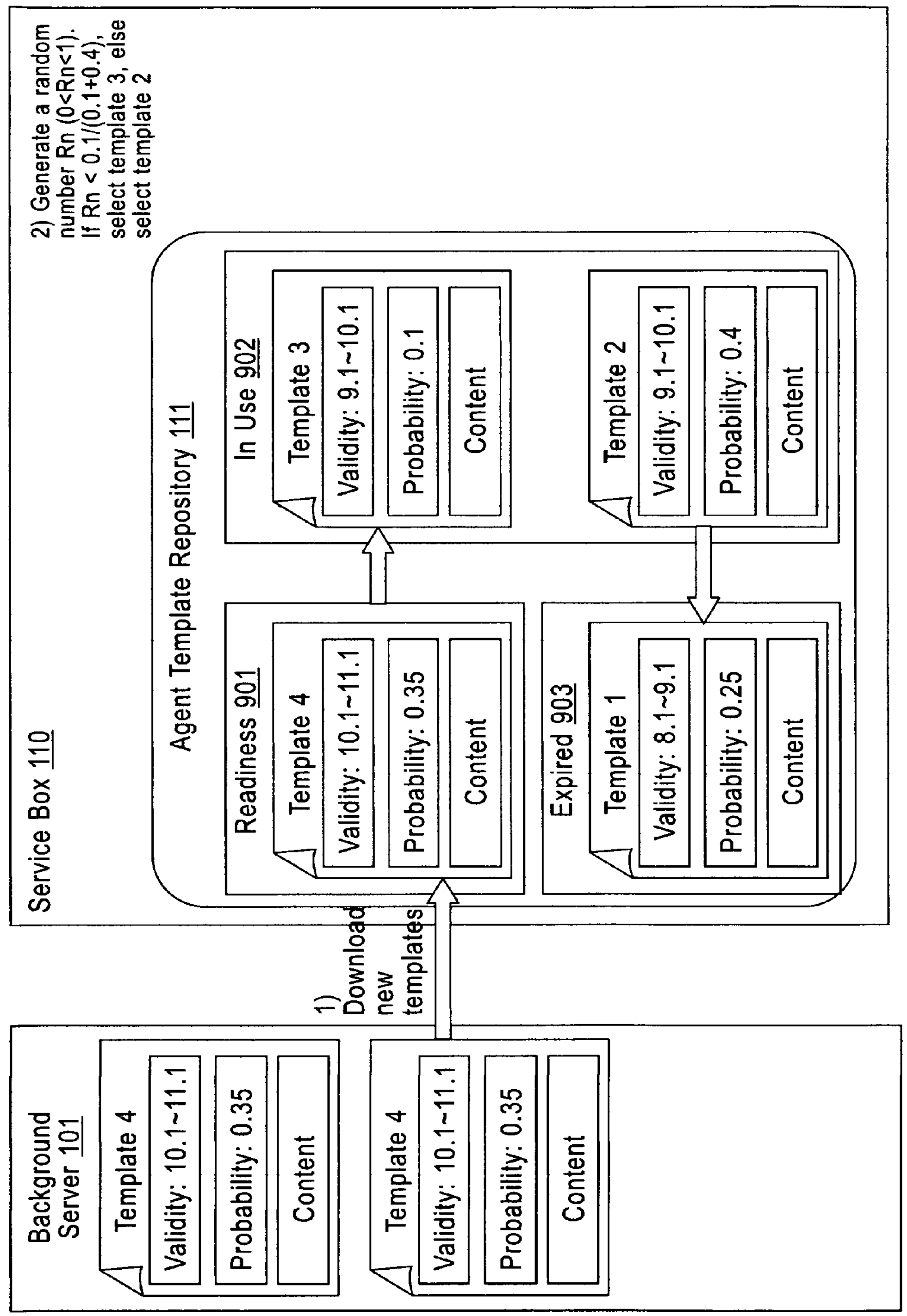
FIG. 9 shows a schematic diagram of a template deployment in the service box according to an embodiment of the present invention.

FIG. 9 shows deployment of the template 103 in the service box 110 according to an embodiment of the present invention. As shown in FIG. 9, the template repository 111 in the service box 110 contains three regions: "Readiness" region 901, "In Use" region 902 and "Expired" region 903. Once the service box 110 is connected to the background server 101, it will download all the updated templates 103 and put them into the "Readiness" region 901. Subsequently, if the content in the "validity period" 305 in a template 103 indicates that the template 103 is in the validity period, the template 103 will be transferred to the "In Use" region 902. If the content in the "validity period" 305 in a template 103 indicates that the template 103 expires, the template 103 will be transferred to the "Expired" region 903. In the process of selecting a template 103 to generate a new agent module 130, the module generator 112 selects a certain template 103 from the "In Use" region 902 in the template repository 111.

Figure 10:
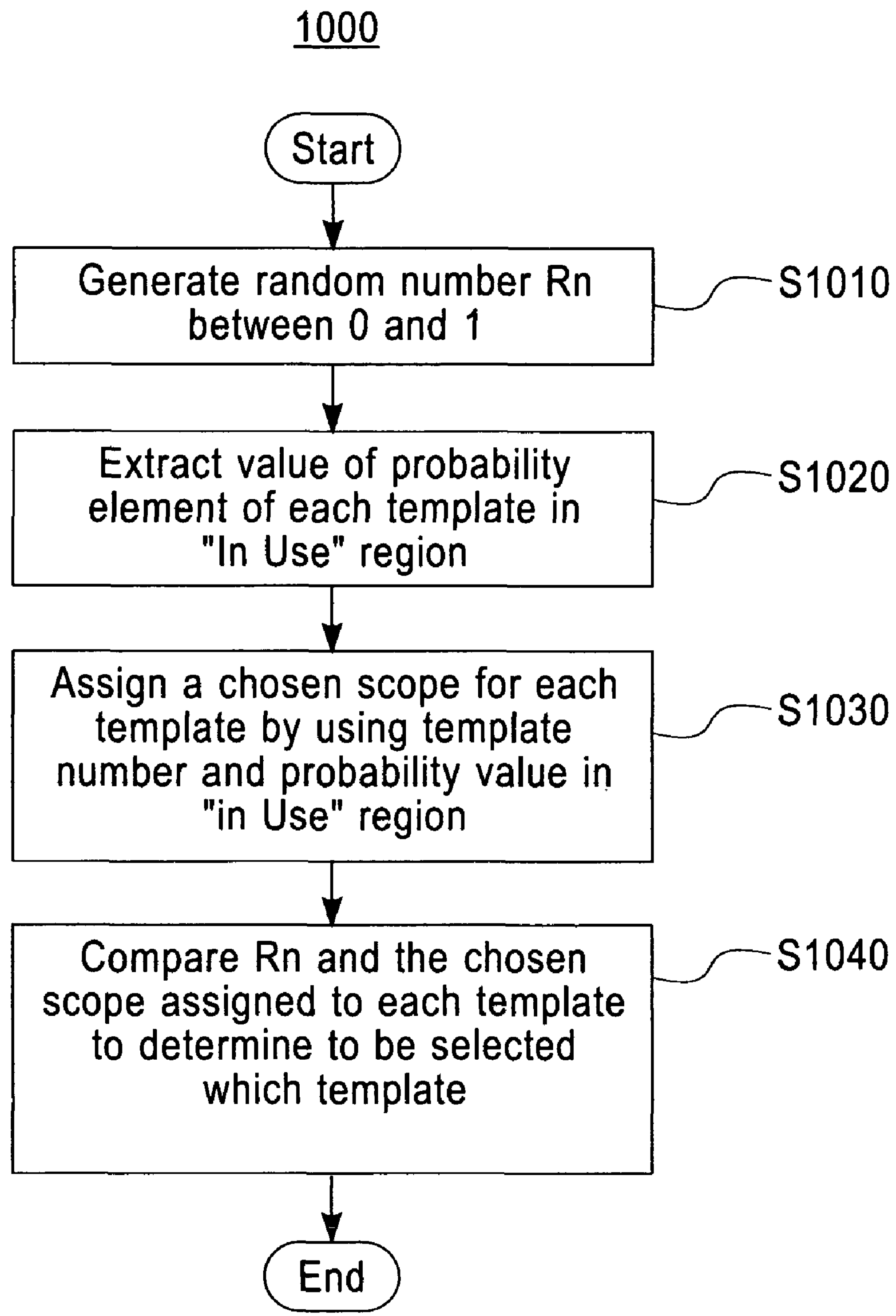
FIG. 10 shows a flow chart of a process for randomly selecting a template according to an embodiment of the present invention.

FIG. 10 shows a process flow 1000 of randomly selecting a template 103 according to an embodiment of the present invention. As shown in FIG. 10, in the process of randomly selecting a template 103, firstly at step S1010, the module generator 112 generates a random number Rn between 0 and 1. Then, at step S1020, for the templates 103 in the "In Use" region 902 of the template repository 111, the values in the probability element 306 of these templates 103 are extracted. Next, in step S1030, with the number of the templates 103 in the "In Use" region 902 and probability value representing the possibility of each template 103 to be selected, a chosen scope which corresponds to the probability value of each template 103 is provided for each template 103. The greater the probability value of the template 103, the bigger the generated chosen scope. That is, the module generator 112 selects the template from the template repository based on the random number and the probability value defined in the template.

FIG. 9 gives an algorithm for calculating the chosen scope. As shown in FIG. 9, at first, a ratio of the probability value of each template 103 relative to a sum of the probability values of all templates 103 in the "In Use" region 902 is calculated. Then, scopes, in which the ratio of each template 103 lies, are arranged in a certain order of the template 130, and thereby the chosen scope of each template is obtained. For example, the "In Use" region 902 contains two templates: a template 3 with a probability value of 0.1 and a template 2 with a probability value of 0.4. According to the algorithm, the ratio of the template 3 is 0.1/(0.1+0.4)=0.2, while the ratio of the template 2 is 0.4/(0.1+0.4)=0.8. Since the arranging order of the templates is the template 3 at first and then the template 2, the chosen scope of the template 3 is 0-0.2, and the chosen scope of the template 2 is 0.2-1.0.

Then, returning to FIG. 10, at step S1040, the random number Rn is compared with the chosen scope of each template 103. If the random number Rn falls into the chosen scope of a certain template 103, the template 103 is selected to generate a new agent module 130.

As described above, the probability that each template 103 is selected to generate the new agent module 130 is closely related to the probability value of each template. Since it can not be estimated which template will be selected, it is very difficult for a cracker to find a general way to crack each newly-generated agent module. Besides, some templates may be selected with a very low probability value and will be rarely selected, so waiting for the presence of all the templates becomes an impossible thing. This makes it almost impossible for the cracker to crack the agent module 130.

Moreover, it should be noted that the process of randomly obtaining the template 103 given in connection with FIG. 10 is only exemplary. Any other random process may be used to select the template 103, as long as the random process makes the probability of choosing each template 103 related to the probability value of the template.

The mechanism and process for preventing integrity of the agent module 130 from being cracked by enforcing updating of agent module 130 and randomly generating the new agent module 130 when updating the agent module 130 have been described above. However, as described previously, in the case that the agent module 130 is running in a software system as a software component, it is still necessary to guarantee integrity of lower software with the agent module 130.

Below, a process of guaranteeing the lower software integrity with the agent module 130 is described with reference to FIG. 11 and FIG. 12. FIG. 11 shows a process flow of verifying the lower software integrity according to an embodiment of the present invention, and FIG. 12 shows a schematic diagram of a message flow of the verifying process.

It is assumed that executable codes for computing integrity characteristic information of the lower software are contained in a certain file of the agent module 130. As to the case that the agent module 130 runs in a multiple-layer software system as an agent component, generally, the multiple-layer software system will strictly restrict invocations between software of respective layers. That is, in a general case, in the multiple-layer software system, the invocation of the upper (layer) software to the lower (layer) software is performed typically through an interface provided by the lower software, and the upper software can not access the address space of the lower software directly. Thus, it is preferable that the executable codes in the agent module 130 for computing the integrity characteristic information of the lower software are divided into two parts, in which one part runs in the upper software space (such as Check.class shown in FIG. 12) and another part runs in the lower software space (such as JNI.dll shown in FIG. 12). Since JNI.dll is in the lower software space, it can compute the integrity characteristic information of each module in the processing space when the lower software is running, and transfer the computation result to the upper space through an interface between JNI.dll and Check.class. Thus, the integrity characteristic information of lower software can be obtained by such division in case of meeting requirements of the multiple-layer software system.

Figure 12:
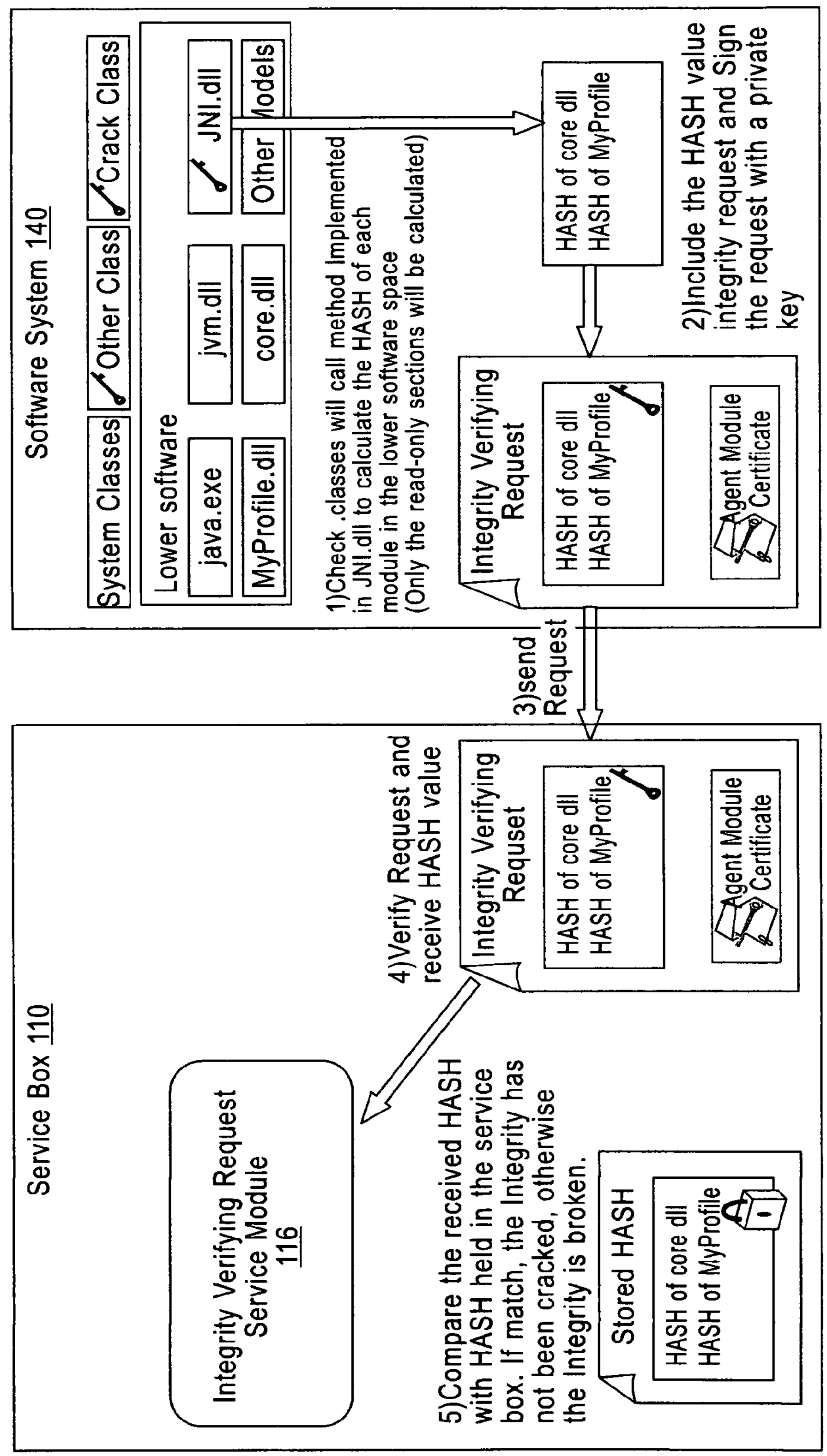
FIG. 12 shows a schematic diagram of a message flow of a process for verifying the integrity of bottom software according to an embodiment of the present invention.

As shown in step S1110 in FIG. 11, when starting to check the space integrity of the lower software, the Check.class (as shown in FIG. 12) located in the upper software space invokes the JNI.dll located in the lower software space, hashes the read-only part of each module in the lower software running space to obtain a hash value for each module. It should be understood by those skilled in the art that the hash value is one of the integrity characteristic information, and in the present invention, obviously other information of a module can also be used as the integrity characteristic information of the module.

The subsequent steps S1120, S1130, S1140, S1150 and S1160 are similar to the steps S725, S730, S735, S740 as described with respect to FIG. 7. That is, the extracted hash values of respective modules are processed as the request to be sent by the agent module 130, wherein the request is encrypted with an agent module key, and the encrypted request is sent to the service box 110 together with an agent module certificate, then, the service box 110 checks whether or not the agent module certificate is correct. At step S1120, an integrity verifying request is generated with the calculated hash value; at step S1130, a key assembly algorithm 313 is extracted to calculate an agent module key; then, at step S1140, the integrity verifying request is encrypted with the agent module key; then at step S1150, the agent module certificate is attached to the verifying request and the verifying request is sent to the service box 110.

At step S1160, the service box 110 receives the verifying request and verifies whether or not the certificate is correct and if it has expired. The step S1160 is different from step S740 in FIG. 7 in that, in step S1160, the validity period of the certificate is also checked, and if the certificate has expired, the process proceeds to step S1165 where a message indicating "the certificate is not correct or is expired" is transmitted to the agent module 130 via the first information transceiver 114 to enforce the agent module 130 to be updated.

If the verification for the certificate is passed, the process proceeds to step S1170. In step S1170, an agent module key in the agent module certificate is extracted so as to decrypt the integrity verifying request. Then, at step S1180, the processor 115 sends the request to the software integrity service module 119 according to the content of the request. Processes in steps S1170 and S1180 are similar to those of steps S745 and S750 in FIG. 7 respectively, with the difference being that the controller 120 will send the request content to the software integrity service module 119 since at this time the content contained in the request sent from the agent module 130 is the hash values of the respective modules.

Then, at step S1190, the software integrity service module 119 compares the hash values of respective modules sent by the agent module 130 with corresponding hash values of respective modules stored in the software integrity service module 119. If they are identical to each other, the software system in the external apparatus 140 is considered to have integrity, and the software system in the external apparatus 140 is permitted to perform further operations at step S1192. Otherwise, the integrity of the software system is considered as broken, and a further process is performed at step S1195 to prevent the software system from running.

That is, the software integrity service module 119 of the service box 110 verifies the integrity of the software system running in the external apparatus 140 by using the integrity characteristic information (hash value) of the software system in the verifying request described above, in response to the verifying request.

As described above, the integrity of the lower software system of the agent module 130 can be verified with the agent module 130 and the service box 110. Further, the prior art has provided a well-known technology to verify the integrity of the upper software by the lower software system, thus the integrity of the software system running in the external apparatus 140 at the customer's site can be guaranteed by combining the inventive method and system of the present invention and the prior art.

Moreover, it is possible that a malicious customer bypasses the agent module 130 and the service box 110. That is, all of the above processes need interaction between the agent module 130 and the service box 110, and if the malicious customer causes the software of the software system in the external apparatus 140 to run without the agent module 130, they may bypass the service box 110. In order to prevent such bypassing, one or more of following approaches can be adopted to ensure that some functions of the software need the help of the service box 110.

1. Some key functions of the software application in the software system may be migrated to the service box 110, as a service provided by the service box 110 (such as the key function service module 118*a* shown in FIG. 2);

2. Some data (e.g., database, invocation parameters, etc.) required for running software applications in the software system have to be encrypted by the service box 110 (such as the encrypting/decrypting service module 118*b*);

3. When a software application running in a software system (such as the software application 1403 shown in FIG. 14) needs to invoke functions provided by another software application in another software system (such as the software application 1404 shown in FIG. 14), the invocations between the software systems have to be performed through the agent module 130.

The processes in the first and second approaches are similar to those regarding the agent module 130 sending requests to the service box 110 in FIGS. 7, 8, 11, and 12, with the differences being that the requests sent by the agent module 130 have different types and contents, and corresponding service modules which perform processing in the service box 110 are different.

For example, if the request sent by the agent module 130 is one or more of a trusted time service request, a key function service request, and a encrypting/decrypting service request, etc., each of modules 117, 118*a,* 118*b* and so on in the service box 110 may provide one or more of the trusted time service, the key function service, and the encrypting/decrypting service to the software system in the external apparatus 140, in response to the received service requests. Thus, malicious customers are prevented from cheating the restriction functions by providing corresponding services. For example, a trusted time source may be provided to prevent time rollback.

Besides, when the agent module 130 invokes the service box 110 to help perform these service functions, as shown in step S1160 in FIG. 11 described above, the service box 110 will check whether or not the agent module 130 has been updated to a new version in time. If not (i.e. the certificate of the agent module 130 has expired), the invocation will be refused, and the agent module 130 is enforced to update to the newest version. That is, the certificate of the request as described above contains a validity period of the agent module 130, and if the validity period has expired, the service box 110 refuses the request and requires the agent module 130 which sends the request to be updated.

Below, a procedure of performing function invocation between the software systems in the third approach mentioned above will be described in detail with reference to FIGS. 13 and 14. FIG. 13 describes a flow chart 1300 of performing function invocation between the software systems according to an embodiment of the present invention, and FIG. 14 describes a schematic diagram of messages of the function invocation between the software systems according to an embodiment of the present invention.

As shown in FIG. 13, at step S1301, a software application in a certain software system (such as the software application 1403 shown in FIG. 14) generates an original inter-system (cross-domain) invocation request. Then, the agent module (such as 140*a* shown in FIG. 14) in the software system extracts an agent module key at step S1305, encrypts the inter-system invocation request with the agent module key at step S1310, and then attaches an agent module certificate to the encrypted request and returns the request containing the agent module certificate to the software application 1403 in the system at step S1315. Processes in steps S1305 to S1315 are similar to those in steps S725 to S735 of FIG. 7 with an only difference being that contents of requests are different.

The process continues to step S1320 where the software application 1403 sends the encrypted inter-system invocation request to the corresponding software application (such as 1404 in FIG. 14) in another software system. The corresponding software application 1404 subsequently sends the encrypted inter-system invocation request to the agent module (such as 140*b* in FIG. 14) in the software system. The agent module 140*b* verifies the certificate contained in the request with the public key of the service box 110 and checks whether or not it has expired at step S1330. If the certificate does not pass the verification or has expired, the inter-system invocation will be refused (step S1335). If the certificate passes the verification and has not yet expired, the agent module 140*b* decrypts the request with the agent module key embedded in the agent module certificate to obtain the original inter-system invocation request at step S1340. Optically, the agent module 140*b* may also perform strategy checking on the decrypted inter-system invocation request to determine whether or not the invocation is permitted (step S1345). If the invocation is not permitted, the inter-system invocation will be refused (step S1335). On the contrary, if the invocation is permitted, the inter-system invocation request is returned to the corresponding software application 1404 for further processing (step S1350).

Figure 14:
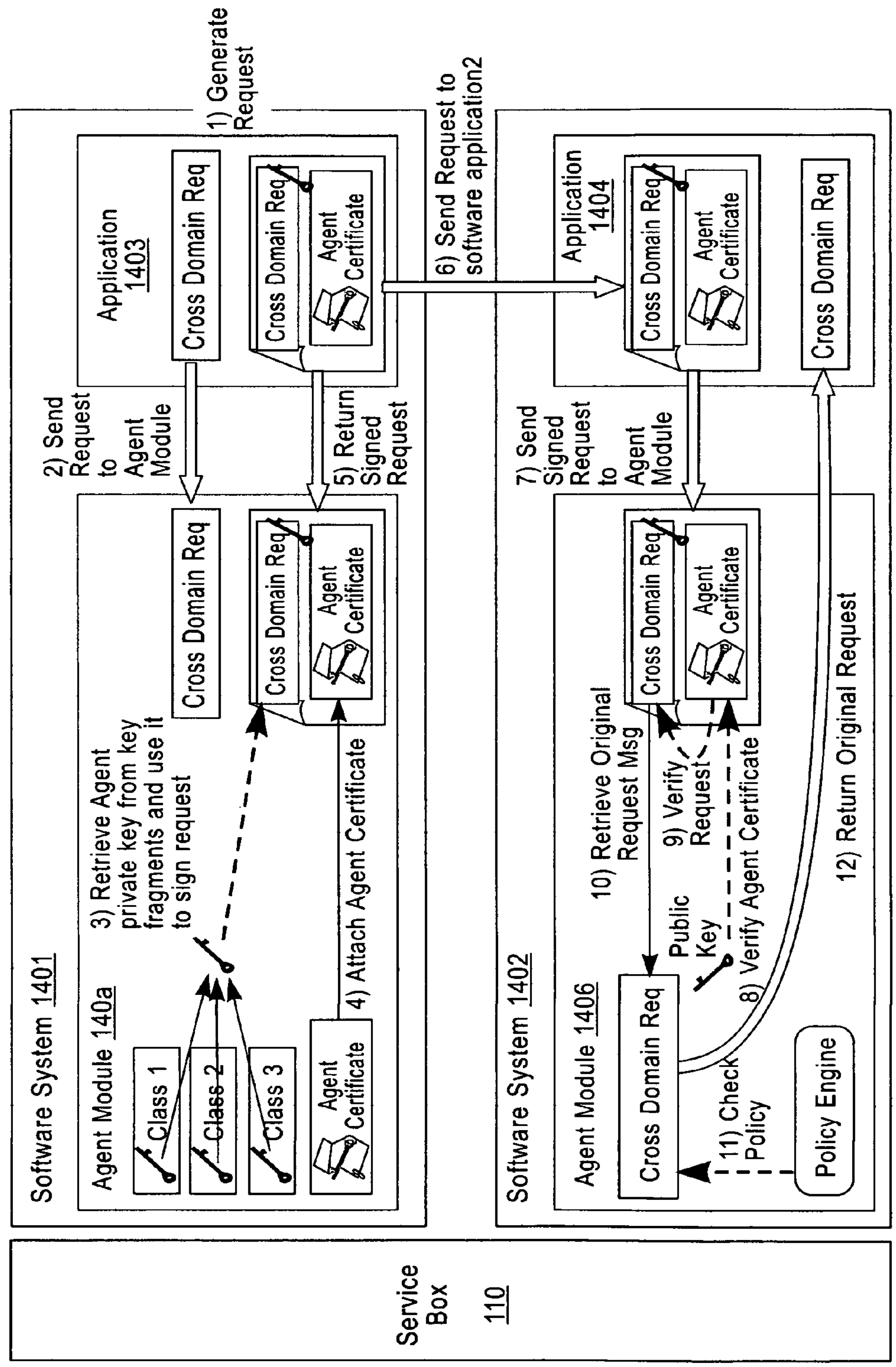
FIG. 14 shows a schematic diagram of a message flow of a process for function invocation between software systems according to an embodiment of the present invention.

FIG. 14 shows a detailed schematic diagram of the inter-system function invocation. Assuming that there are two software systems 1401 and 1402 according to the present invention, in which the software system 1401 includes an agent module 140*a* and a software application 1403 and the software system 1402 includes an agent module 140*b* and a software application 1404. When the software application 1430 invokes the functions provided by the software application 1404 in the software system 1402, it sends a function invoking request to the agent module 140*a* for encrypting and signing, then sends the encrypted request and signature to the software application 1404. After receiving the encrypted request and signature, the software application 1404 requests the agent module 140*b* in its software system 1402 to verify and decrypt the request, so as to obtain the original function invoking request. The agent module 140*b* also includes a strategy engine 1405 which checks strategy of the function invoking request to determine whether or not the invocation is permitted, and returns the request to the software application 1404 for subsequent processing if permitted.

Three approaches for preventing the agent module 130 from being bypassed have been described above, through which the running of software systems in the external apparatus 140 can not bypass the agent module 130 at all, and thereby can not bypass the service box 110.

As described above, according to the secure apparatus, system and method provided by the present invention, the agent module in the software system of the external apparatus is enforced to update to the newest version periodically and automatically, and selection of the new version is random, so it is hard for crackers to find a way to crack the agent module. Besides, the agent module can guarantee the integrity of software systems in the external apparatus where the agent module is located by interaction with the secure apparatus, and the running of software systems in the external apparatus can not bypass the agent module and secure apparatus, so the secure apparatus, system and method provided according to the present invention can protect software systems running in an insecure environment with a relative higher secure level.

Moreover, the secure apparatus itself is deployed in a secure embedded system where there is no approach to run an unauthorized software, and the integrity of the apparatus itself will be verified during the loading. These approaches guarantee that the secure apparatus itself is hard to be cracked.

Figure 15:
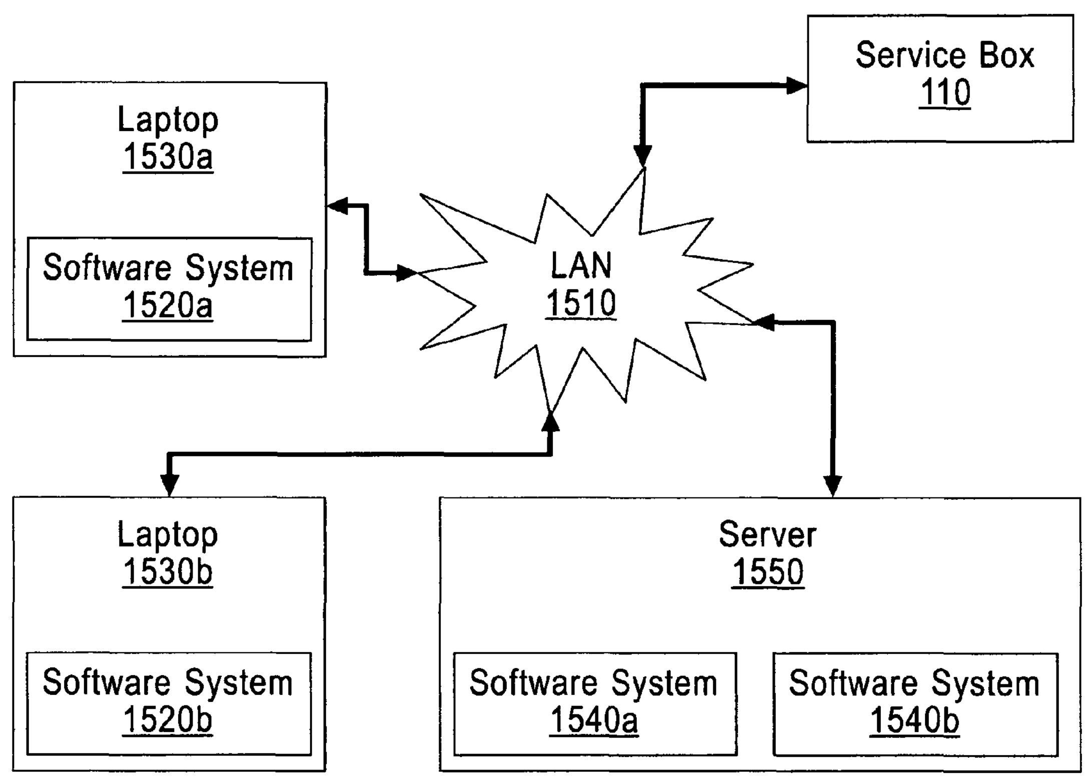
FIG. 15 shows a typical arrangement diagram of the system according to the present invention.

Besides, the connection between the secure apparatus and the software system of the external apparatus may adopt any type of connection, and the software system may be deployed in a desktop or laptop computer, or a plurality of software systems may be deployed in one server. All these software systems may share the same secure apparatus to reduce cost. FIG. 15 gives a typical deployment of the software protection system of the present invention, in which the service box 110 is connected to LAN 1510 as a separated apparatus, the software systems 1520*a* and 1520*b* containing agent modules reside in the laptop computers 1530*a* and 1530*b* as the external apparatuses, respectively, and the software systems 1520*a* and 1520*b* containing continuously-updated templates reside in the same server 1550. The computers 1530*a* and 1530*b* and the server 1550 are all connected to the LAN 1510. The software systems 1520*a*, 1520*b*, 1540*a* and 1540*b* are connected with the service box 110 via the LAN, and share the same service box 110. The operating manner of the above system is similar to the software protection system shown in FIG. 2 and the description thereof will be omitted here.

It is to be noted that the embodiments of the present invention may be implemented by ways of hardware, software, or combination thereof. Further, the structure of each part in the embodiments of the present invention as described does not limit the scope of the present invention, in which the functions of a plurality of parts may be achieved by incorporating the plurality of parts into one part, and the functions of a certain part may be achieved by being divided into a plurality of parts. For example, the functions of the processor 115 and controller 120 in the service box 110 may be individually achieved by a single part such as the controller 120.

While certain embodiments of the present invention have been shown and described with reference to drawings, it is to be understood by those skilled in the art that the above description is only for illustrating the examples of the present invention, and changes and variations may be made to these embodiments in form and details without departing from the spirit or scope of the following claims and the equivalents thereof.

What is claimed is:

1. A secure apparatus for protecting integrity of a software system installed in at least one external apparatus comprising:

a template repository for storing templates required for generating more than one different agent module;

an agent module generator for randomly selecting a template from templates stored in the template repository and generating a new agent module according to the selected template; and a transceiver for sending said new agent module to an external apparatus communicating with said secure apparatus to update a current agent module which is running in said external apparatus, wherein said current agent module is used to verify integrity of said software system running in said external apparatus.

2. The secure apparatus of claim 1, further comprising:

a second transceiver for discontinuously receiving new templates from a service providing terminal outside of said secure apparatus and storing them into said template repository.

3. The secure apparatus of claim 1, wherein said agent module generator selects said template from said template repository based on a random number and a probability value defined in said template.

4. The secure apparatus of claim 1, wherein a certificate and a disassembled first key are embedded in said current agent module and said new agent module, and said certificate is obtained by encrypting the first key with a second key.

5. The secure apparatus of claim 4, wherein said transceiver receives a request generated by said current agent module from said external apparatus, and said request is encrypted with said first key extracted from the current agent module and is attached with said certificate.

6. The secure apparatus of claim 5, wherein said request is an agent module update request which is sent to said secure apparatus periodically, and said agent module generator generates said new agent module in response to said agent module update request.

7. The secure apparatus of claim 5, wherein said request is a verifying request, and said secure apparatus further comprises a verifying module which verifies the integrity of the software system running in said external apparatus by using integrity characteristic information of the software system in said verifying request, in response to said verifying request.

8. The secure apparatus of claim 5, wherein said request is a service request, and said secure apparatus further comprises a service module which provides one or more of a trusted time service, a key function service, and an encrypting/decrypting service to said software system in response to said service request.

9. The secure apparatus of claim 5, wherein the certificate in said request contains a validity period of said current agent module, and if said validity period has expired, said request is refused and the current agent module which sends said request is required to be updated.

10. The secure apparatus of claim 5, further comprising a processor for decrypting said certificate with said second key to obtain said first key, and for decrypting the encrypted request with said first key to obtain said request.

11. A method by a secure apparatus of protecting integrity of a software system installed in at least one external apparatus, comprising steps of:

selecting a template for generating an agent module;

generating a new agent module from the selected template; and sending said new agent module to an external apparatus communicating with said secure apparatus to update a current agent module which is running in said external apparatus, wherein said current agent module is used to verify the integrity of said software system running in said external apparatus.

12. The method of claim 11, further comprising a step of receiving new templates discontinuously from a service providing terminal outside of said secure apparatus and storing them into a template repository.

13. The method of claim 11, wherein said template is selected based on a random number and a defined probability value.

14. The method of claim 11, further comprising a step of encrypting a first key with a second key to obtain a certificate, and the certificate and disassembled first key being embedded in said current agent module and said new agent module.

15. The method of claim 14, further comprising a step of receiving a request generated by said current agent module from said external apparatus, wherein said request is encrypted with said first key extracted from the current agent module and is attached with said certificate.

16. The method of claim 15, wherein said request is an agent module update request which is sent to said secure apparatus periodically, and said new agent module is generated in response to said agent module update request.

17. The method of claim 15, wherein said request is a verifying request, and said method further comprises a step of verifying the integrity of said software system running in said external apparatus by using the integrity characteristic information of said software system in said verifying request, in response to said verifying request.

18. The method of claim 15, wherein said request is a service request, and said method further comprises a step of providing one or more of a trusted time service, a key function service, and an encrypting/decrypting service to said software system in response to said service request.

19. The method of claim 15, wherein the certificate in said request contains a validity period of said current agent module, and if said validity period has expired, said request is refused and the current agent module which sends said request is required to be updated.

20. The method of claim 15, further comprising a step of decrypting said certificate with said second key to obtain said first key, and decrypting the encrypted request with said first key to obtain said request.

21. A system for protecting integrity of a software system, comprising:

a secure apparatus comprising:

at least one processor for executing components;

a template providing apparatus component for storing and updating templates required for generating more than one different agent module;

an agent module security component for randomly selecting a template from said template providing apparatus and generating a new agent module from the received template; and a communications component for sending the new agent module to an external apparatus; and an external apparatus for running said software system and a current agent module wherein said current agent module is used to verify the integrity of said software system, wherein said agent module security component sends said new agent module to said external apparatus to update said current agent module.

* * * * *